United States Patent

Hase et al.

[11] 4,128,498
[45] Dec. 5, 1978

[54] CHLOROSILICATE PHOSPHOR

[75] Inventors: Takashi Hase, Ebina; Masatake Yoshikawa, Hiratsuka; Haruyuki Takanashi, Hatano; all of Japan

[73] Assignee: Dai Nippon Toryo Co., Ltd., Osaka, Japan

[21] Appl. No.: 890,940

[22] Filed: Mar. 28, 1978

[30] Foreign Application Priority Data

Mar. 28, 1977 [JP] Japan .................................. 52-34305

[51] Int. Cl.² .......................................... C09K 11/46
[52] U.S. Cl. ........................ 252/301.4 F; 252/301.4 H
[58] Field of Search ................. 252/301.4 F, 301.4 H

[56] References Cited

U.S. PATENT DOCUMENTS

| 2,118,091 | 5/1938 | Leverenz | 252/301.4 F |
| 2,457,054 | 12/1948 | Leverenz | 252/301.4 F |
| 2,547,790 | 4/1951 | Smith | 252/301.4 F |
| 3,651,363 | 3/1972 | Barry | 252/301.4 F |
| 3,676,361 | 7/1972 | Datta | 252/301.4 F |
| 3,790,490 | 2/1974 | Datta et al. | 252/301.4 F |
| 3,813,569 | 5/1974 | Verstegen et al. | 252/301.4 F |
| 3,839,219 | 10/1974 | Verstegent et al. | 252/301.4 F |

FOREIGN PATENT DOCUMENTS 2425566 12/1974 Fed. Rep. of Germany.
1087655 10/1967 United Kingdom.

Primary Examiner—Jack Cooper

[57] ABSTRACT

A divalent europium activated strontium beryllium chlorosilicate phosphor represented by the formula $$Sr_{4-x-y}Be_xEu^{2+}{}_ySi_3O_8Cl_4$$

wherein x is a number within the range of $0 < x \leq 1.5$ and y is a number within the range of $0.001 \leq y \leq 0.50$.

2 Claims, 1 Drawing Figure

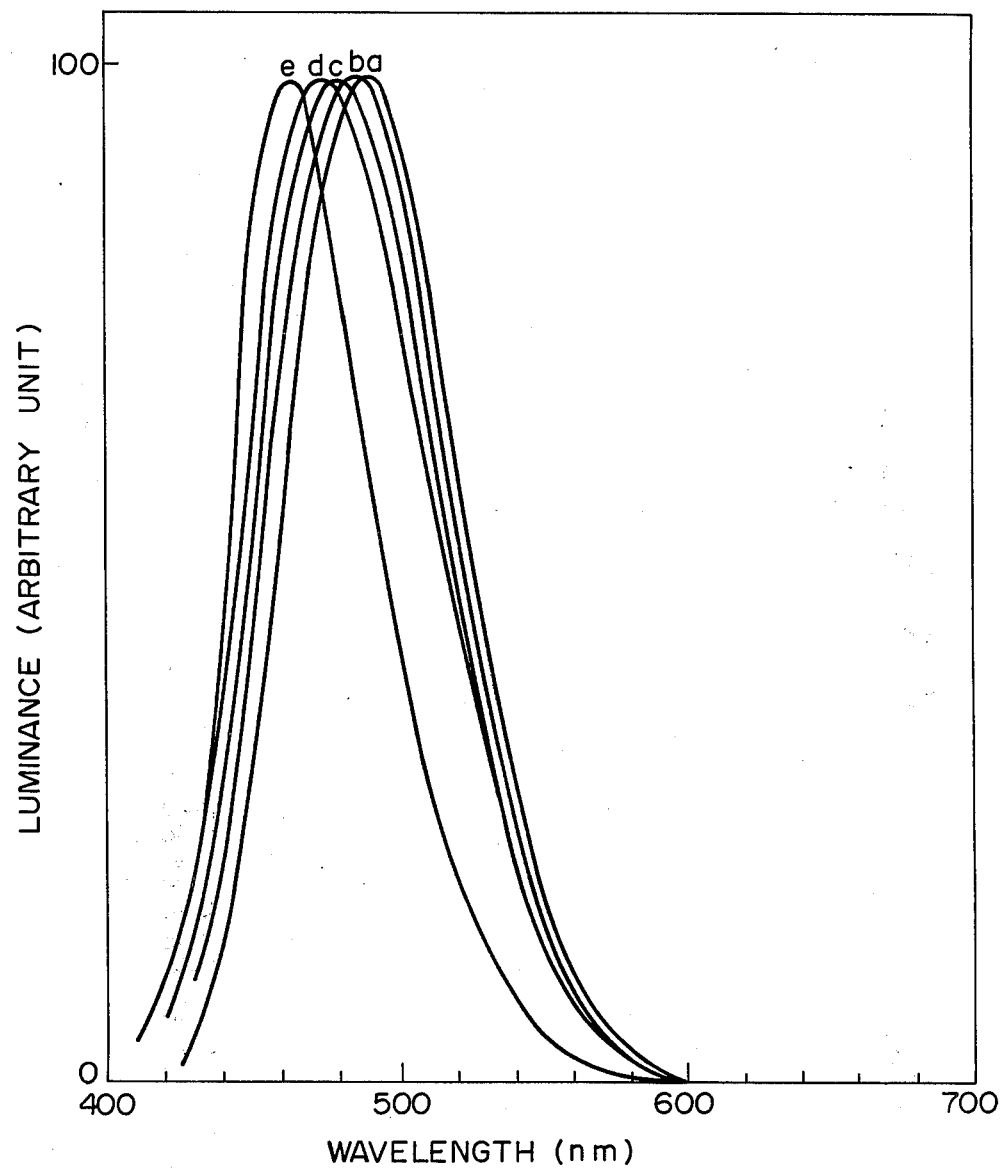

CHLOROSILICATE PHOSPHOR

BACKGROUND OF THE INVENTION

1. Field of the Invention

This invention relates to a chlorosilicate phosphor, and more particularly to a divalent europium activated strontium beryllium chlorosilicate phosphor.

2. Description of the Prior Art

British Pat. No. 1,087,655 and "Journal of Luminescence 3 (1971), 467–476" disclose a divalent europium activated strontium chlorosilicate phosphor [$(Sr,Eu^{2+})_4Si_3O_8Cl_4$] as one of chlorosilicate phosphors. The $(Sr,Eu^{2+})_4Si_3O_8Cl_4$ phosphor emits blue-green light of high luminance under excitation by ultraviolet rays, vacuum ultraviolet rays (xenon resonance line of 147nm), cathode rays, etc. Especially, as the emission efficiency of the phosphor under excitation by ultraviolet rays is markedly high even in a higher temperature range, the phosphor has been used as a color rendering phosphor for high pressure mercury vapor lamps.

However, the emission peak of the above described $(Sr,Eu^{2+})_4Si_3O_8Cl_4$ phosphor cannot be shifted from the wavelength of about 490nm, that is, the color of the light emitted thereby cannot be varied, which reduces the value of the $(Sr,Eu^{2+})_4Si_3O_8Cl_4$ phosphor as a color rendering phosphor.

SUMMARY OF THE INVENTION

Therefore, the object of the present invention is to provide the $(Sr,Eu^{2+})_4Si_3O_8Cl_4$ phosphor in which the aforementioned emission property is improved.

In order to accomplish the aforementioned object of the present invention, the inventors made various investigations. As the result of the investigations, it was discovered that by replacing a proper amount of strontium which is a matrix component of the $(Sr,Eu^{2+})_4Si_3O_8Cl_4$ phosphor with beryllium, the emission peak at wavelength of about 490nm of the $(Sr,Eu^{2+})_4Si_3O_8Cl_4$ phosphor can be shifted toward the shorter wavelength side. The emission peak of the phosphor of the present invention shifts from 490nm (blue-green) to 460nm (blue) with the increase of the amount of the beryllium which replaces the strontium. Therefore, the phosphor of the present invention is more valuable as a color rendering phosphor for high pressure mercury vapor lamps or the like than the conventional $(Sr,Eu^{2+})_4Si_3O_8Cl_4$ phosphor having emission peak at the wavelength of about 490nm.

The divalent europium activated strontium beryllium chlorosilicate phosphor of the present invention is represented by the following formula

$Sr_{4-x-y}Be_xEu^{2+}{}_ySi_3O_8Cl_4$ wherein $x$ is a number within the range of $0 < x \leq 1.5$ and $y$ is a number within the range of $0.001 \leq y \leq 0.50$.

Similarly to the conventional $(Sr,Eu^{2+})_4Si_3O_8Cl_4$ phosphor, the phosphor of the present invention represented by the aforementioned formula exhibits high emission efficiency under excitation by ultraviolet rays, vacuum ultraviolet rays, cathode rays, etc., especially markedly high emission efficiency under excitation by ultraviolet rays even in a higher temperature range. But the color of the light emitted by the phosphor of the present invention differs from that of the conventional $(Sr,Eu^{2+})_4Si_3O_8Cl_4$ phosphor and is variable from blue-green to blue with increase of the amount of the beryllium incorporated in the phosphor. Particularly, from the viewpoint of the emission efficiency, the preferable ranges of the $x$ and $y$ are $0 < x \leq 1.2$ and $0.01 \leq y \leq 0.30$, respectively.

BRIEF DESCRIPTION OF THE DRAWING

The single FIGURE in the accompanying drawing is a graph showing the emission spectra of the divalent europium activated strontium beryllium chlorosilicate phosphors of the present invention, in which the curves $a$ to $e$ show the phosphors as represented below.

curve $a$ : $Sr_{3.7}Be_{0.15}Eu^{2+}{}_{0.15}Si_3O_8Cl_4$ phosphor
curve $b$ : $Sr_{3.5}Be_{0.35}Eu^{2+}{}_{0.15}Si_3O_8Cl_4$ phosphor
curve $c$ : $Sr_{3.35}Be_{0.5}Eu^{2+}{}_{0.15}Si_3O_8Cl_4$ phosphor
curve $d$ : $Sr_{3.15}Be_{0.7}Eu^{2+}{}_{0.15}Si_3O_8Cl_4$ phosphor
curve $e$ : $Sr_{2.65}Be_{1.2}Eu^{2+}{}_{0.15}Si_3O_8Cl_4$ phosphor

DETAILED DESCRIPTION OF THE INVENTION

The phosphor of the present invention represented by the above mentioned formula is prepared by the following process.

The following raw materials are used:

(1) a strontium oxide (SrO) or strontium compounds which can be easily converted to SrO at a high temperature, such as strontium nitrate, strontium sulfate, strontium carbonate, strontium hydroxide, etc., (2) a strontium chloride ($SrCl_2$), (3) a beryllium oxide (BeO) or beryllium compounds which can be easily converted to BeO at a high temperature, such as beryllium carbonate, etc., (4) a silicon dioxide ($SiO_2$) or silicon compounds which can be easily converted to $SiO_2$ at a high temperature, such as silicic acid ($H_4SiO_4$), etc., and (5) a europium oxide ($Eu_2O_3$) or europium compounds which can be easily converted to $Eu_2O_3$ at a high temperature, such as europium nitrate, europium carbonate, etc.

The aforesaid five raw materials are weighed out in a stoichiometric ratio given by the formula

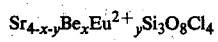

$Sr_{4-x-y}Be_xEu_ySi_3O_8Cl_4$ wherein $x$ is a number within the range of $0 < x \leq 1.5$ and $y$ is a number within the range of $0.001 \leq y \leq 0.50$, and mixed well. The raw materials are mechanically mixed by means of a ball mill, a mixer mill, a mortar, etc. or mixed in the form of paste using a medium such as water. From the viewpoint of the emission efficiency of the phosphor obtained, preferable ranges of the $x$ and $y$ are $0 < x \leq 1.2$ and $0.01 \leq y \leq 0.30$, respectively.

In the conventional production of phosphors, a flux is frequently added to the raw materials to improve emission efficiency and accelerate the crystallization of the phosphor obtained. In a like manner, a proper amount of chloride such as ammonium chloride ($NH_4Cl$), lithium chloride (LiCl) or the like can be mixed with the aforesaid raw materials as a flux in preparing the phosphor of the present invention, thereby the emission efficiency of the phosphor obtained is enhanced. Another purpose of using the chloride flux is to always keep the reaction system in a chlorine rich condition during the firing step mentioned hereinafter.

Then, the aforesaid raw material mixture is placed in a heat resistant container such as a quartz crucible, an alumina crucible or the like, and fired. Where the raw materials are mixed as a paste, the raw material mixture is dried before fired. The firing is performed more than once in an air or in a reducing atmosphere. The last firing must be done in a reducing atmosphere to reduce trivalent europium to divalent europium. A proper firing temperature range is from 500° C. to 1100° C. and a preferable temperature range is from 600° C. to 1000° C. The firing period is determined depending on the amount of the raw materials, the firing temperature and so forth. The firing period is usually from 0.5 hours to 6 hours in the aforesaid firing temperature range and preferably from 1 hour to 5 hours. As a reducing atmosphere, a nitrogen atmosphere containing from 0.5% to 10%, preferably about 2% of hydrogen, or a carbon vapor atmosphere can be used.

After firing, the fired product is subjected to the treatments generally employed in the production of phosphor, such as washing, drying, sieving and so forth to obtain the desired phosphor.

By the process described above, the divalent europium activated strontium beryllium chlorosilicate phosphor represented by the following formula can be obtained, $$Sr_{4-x-y}Be_xEu^{2+}{}_ySi_3O_8Cl_4$$

wherein $x$ and $y$ have the same definition as defined hereinbefore.

The phosphor of the present invention obtained by the aforesaid process emits blue to blue-green light of high luminance under excitation by ultraviolet rays, vacuum ultraviolet rays, cathode rays, etc., and the color of the light emitted thereby varies depending on the amount of the beryllium ($x$ value) incorporated therein. That is, with the increase of the $x$ value, the emission peak of the phosphor gradually shifts from about 490nm which is the emission peak of the conventional $(Sr,Eu^{2+})_4Si_3O_8Cl_4$ phosphor to the shorter wavelength side. Therefore the color of the light emitted from the phosphor becomes blue.

The FIGURE in the accompanying drawing is a graph showing the emission spectra of the phosphors of the present invention when the amount of $Eu^{2+}$ ($y$ value) is constant ($y+0.15$) and the amount of beryllium ($x$ value) is varied. In the graph, curves $a$, $b$, $c$, $d$ and $e$ are the emission spectra of the $Sr_{3.7}Be_{0.15}Eu^{2+}{}_{0.15}Si_3O_8Cl_4$, $Sr_{3.5}Be_{0.35}Eu^{2+}{}_{0.15}Si_3O_8Cl_4$, $Sr_{3.35}Be_{0.5}Eu^{2+}{}_{0.15}Si_3O_8Cl_4$, $Sr_{3.15}Be_{0.7}Eu^{2+}{}_{0.15}Si_3O_8Cl_4$ and $Sr_{2.65}Be_{1.2}Eu^{2+}{}_{0.15}Si_3O_8Cl_4$ phosphors, respectively. As is clear from the graph, with the increase of the amount of the beryllium, the emission peak gradually shifts toward the shorter wavelength side, and the color of the light emitted by the phosphor becomes blue.

As mentioned above, the color of the light emitted by the phosphor of the present invention is determined only by the amount of the beryllium incorporated therein, not by the amount of activator $Eu^{2+}$.

As described hereinabove, the divalent europium activated strontium beryllium chlorosilicate phosphor in accordance with the present invention emits blue to blue-green light of high luminance under excitation by ultraviolet rays, vacuum ultraviolet rays, cathode rays, etc., and the emission efficiency thereof is markedly high even in a higher temperature range. Therefore, the phosphor in accordance with the present invention is very useful as a color rendering phosphor for low or high pressure mercury vapor lamps and as a phosphor for gass discharge lamp and so forth. Whereas the conventional $(Sr,Eu^{2+})_4Si_3O_8Cl_4$ phosphor only emits unvariable blue-green light based on the emission peak at the wavelength of about 490nm, the color of the light emitted by the phosphor of the present invention can be varied from blue to blue-green by controlling the amount of the beryllium incorporated therein. Hence, the phosphor of the present invention has an advantage that, in practical use, one can choose a desired color of the light at will from the range of blue to blue-green.

The present invention will hereinbelow be described more concretely referring to the following examples.

EXAMPLE 1

| | | |
|---|---|---|
| Strontium nitrate | $Sr(NO_3)_2$ | 4.6 g |
| Strontium chloride | $SrCl_2 \cdot 6H_2O$ | 17.8 g |
| Beryllium carbonate | $BeO \cdot BeCO_3 \cdot 1.7H_2O$ | 2.5 g |
| Silicon dioxide | $SiO_2$ | 6.0 g |
| Europium nitrate | $Eu(NO_3)_3 \cdot 6H_2O$ | 2.2 g |
| Ammonium chloride | $NH_4Cl$ | 1.8 g |

A paste was prepared by mixing the above described raw materials, the above described flux and water. The resultant paste was dried and then mixed well in a mortar. The resultant mixture was placed in a quartz crucible and then fired for 2 hours at 700° C. in an air. The fired product was crushed, placed in a quartz crucible and then fired again for 3 hours at 960° C. in a carbon vapor atmosphere. After firing, the fired product was washed several times with warm water, dried and sieved to obtain $Sr_{2.65}Be_{1.2}Eu^{2+}{}_{0.15}Si_3O_8Cl_4$ phosphor.

The phosphor thus prepared emitted blue light of high luminance under excitation by ultraviolet rays, vacuum ultraviolet rays, cathode rays, etc. The emission spectrum of the phosphor is shown in the graph as curve $e$.

EXAMPLE 2

| | | |
|---|---|---|
| Strontium carbonate | $SrCO_3$ | 5.9 g |
| Strontium chloride | $SrCl_2 \cdot 6H_2O$ | 17.8 g |
| Beryllium carbonate | $BeO \cdot BeCO_3 \cdot 1.7H_2O$ | 1.4 g |
| Silicon dioxide | $SiO_2$ | 6.0 g |
| Europium nitrate | $Eu(NO_3)_3 \cdot 6H_2O$ | 1.5 g |
| Ammonium chloride | $NH_4Cl$ | 1.8 g |

The above described raw materials and flux were mixed well in a ball mill. The resultant mixture was placed in a quartz crucible and then fired for 2 hours at 600° C. in an air. The fired product was crushed, placed in a quartz crucible and then fired again for 2 hours at 1000° C. in a nitrogen atmosphere containing 2% of hydrogen. After firing, the fired product was washed several times with warm water, dried and sieved to obtain $Sr_{3.2}Be_{0.7}Eu^{2+}{}_{0.1}Si_3O_8Cl_4$ phosphor.

The phosphor thus prepared emitted blue light of high luminance under excitation by ultraviolet rays, vacuum ultraviolet rays, cathode rays, etc. The emission spectrum of the phosphor is shown in the graph as curve $d$.

EXAMPLE 3

| | | |
|---|---|---|
| Strontium nitrate | $Sr(NO_3)_2$ | 9.5 g |
| Strontium chloride | $SrCl_2 \cdot 6H_2O$ | 17.8 g |
| Beryllium oxide | $BeO$ | 0.4 g |
| Silicon dioxide | $SiO_2$ | 6.0 g |
| Europium oxide | $Eu_2O_3$ | 0.9 g |
| Ammonium chloride | $NH_4Cl$ | 1.8 g |

A paste was prepared by mixing the above described raw materials, the above described flux and water. The resultant paste was dried and then mixed well in a morter. The resultant mixture was placed in a quartz crucible and then fired for 2 hours at 650° C. in an air. The fired product was crushed, placed in a quartz crucible and then fired for 3 hours at 950° C. in a carbon vapor atmosphere. After firing, the fired product was washed several times with warm water, dried and sieved to obtain $Sr_{3.35}Be_{0.5}Eu^{2+}_{0.15}Si_3O_8Cl_4$ phosphor.

The phosphor thus prepared emitted blue light of high luminance under excitation by ultraviolet rays, vacuum ultraviolet rays, cathode rays, etc. The emission spectrum of the phosphor is shown in the graph as curve c.

EXAMPLE 4

| Strontium hydroxide | $Sr(OH)_2$ | 6.3 g |
|---|---|---|
| Strontium chloride | $SrCl_2 \cdot 6H_2O$ | 17.8 g |
| Beryllium oxide | BeO | 0.3 g |
| Silicon dioxide | $SiO_2$ | 6.0 g |
| Europium nitrate | $Eu(NO_3)_3 \cdot 6H_2O$ | 1.5 g |
| Ammonium chloride | $NH_4Cl$ | 1.8 g |

The above described raw materials and flux were mixed well in a ball mill. The resultant mixture was placed in a quartz crucible and then fired for 1 hour at 750° C. in an air. The fired product was crushed, placed in a quartz crucible and then fired again for 2 hours at 1000° C. in a nitrogen atmosphere containing 2% of hydrogen. After firing, the fired product was washed several times with warm water, dried and sieved to obtain $Sr_{3.55}Be_{0.35}Eu^{2+}_{0.1}Si_3O_8Cl_4$ phosphor.

The phosphor thus prepared emitted green-blue light of high luminance under excitation by ultraviolet rays, vacuum ultraviolet rays, cathode rays, etc. The emission spectrum of the phosphor is shown in the graph as curve b.

EXAMPLE 5

| Strontium nitrate | $Sr(NO_3)_2$ | 12.0 g |
|---|---|---|
| Strontium chloride | $SrCl_2 \cdot 6H_2O$ | 17.8 g |
| Beryllium carbonate | $BeO \cdot BeCO_3 \cdot 1.7H_2O$ | 0.3 g |
| Silicon dioxide | $SiO_2$ | 6.0 g |
| Europium nitrate | $Eu(NO_3)_3 \cdot 6H_2O$ | 2.2 g |
| Ammonium chloride | $NH_4Cl$ | 1.8 g |

A paste was prepared by mixing the above described raw materials, the above described flux and water. The resultant paste was dried and then mixed well in a mortar. The resultant mixture was placed in a quartz crucible and then fired for 2 hours at 650° C. in an air. The fired product was crushed, placed in a quartz crucible and then fired again in a quartz crucible for 3 hours at 950° C. in a carbon vapor atmosphere. After firing, the fired product was washed several times with warm water, dried and sieved to obtain $Sr_{3.7}Be_{0.15}Eu^{2+}_{0.15}Si_3O_8Cl_4$ phosphor.

The phosphor thus prepared emitted blue-green light of high luminance under excitation by ultraviolet rays, vacuum ultraviolet rays, cathode rays, etc. The emission spectrum of the phosphor is shown in the graph as curve a.

We claim:

1. A divalent europium activated strontium beryllium chlorosilicate phosphor represented by the formula

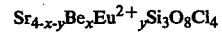

$$Sr_{4-x-y}Be_xEu^{2+}_ySi_3O_8Cl_4$$

wherein x is a number within the range of $0 < x \leq 1.5$ and y is a number within the range of $0.001 \leq y \leq 0.50$ and exhibiting an emission peak that is at a shorter wave length than the emission peak of said phosphor without Be.

2. The divalent europium activated strontium beryllium chlorosilicate phosphor as defined in claim 1 wherein said x is a number within the range of $0 < x \leq 1.2$ and said y is a number within the range of $0.01 \leq y \leq 0.30$.

* * * * *